United States Patent [19]
Koura et al.

[11] Patent Number: 5,168,666
[45] Date of Patent: Dec. 8, 1992

[54] DRIVE DEVICE OF SLIDE DOOR

[75] Inventors: Soushichi Koura; Jun Yamagishi; Masaichi Moriya; Hirotaka Nishizima, all of Yokohama, Japan

[73] Assignee: Ohi Seisakusho Co., Ltd., Yokohama, Japan

[21] Appl. No.: 723,269

[22] Filed: Jun. 28, 1991

[30] Foreign Application Priority Data

Jun. 29, 1990 [JP] Japan .................................. 2-170138

[51] Int. Cl.$^5$ ............................................ E05F 15/14
[52] U.S. Cl. ........................................ 49/360; 49/280
[58] Field of Search ................... 49/360, 362, 213, 280

[56] References Cited

U.S. PATENT DOCUMENTS

| 4,640,050 | 2/1987 | Yamagishi et al. | 49/360 X |
| 4,862,640 | 9/1989 | Boyko et al. | 49/280 X |
| 4,893,435 | 1/1990 | Shalit | 49/360 |
| 4,932,715 | 6/1990 | Kramer | 49/360 X |

FOREIGN PATENT DOCUMENTS

| 0358874 | 3/1990 | European Pat. Off. . |
| 2805411 | 8/1979 | Fed. Rep. of Germany . |
| 3526761 | 2/1986 | Fed. Rep. of Germany . |
| 2449186 | 9/1980 | France . |
| 61-36480 | 2/1986 | Japan . |
| 1-164647 | 6/1989 | Japan . |
| 2159208 | 11/1985 | United Kingdom . |
| 2168424 | 6/1986 | United Kingdom . |

Primary Examiner—Philip C. Kannan
Attorney, Agent, or Firm—Foley & Lardner

[57] ABSTRACT

A door drive device is disclosed, which comprises a guide rail for defining in the body of the vehicle a way along which the slide door moves; first and second pulleys arranged at spaced positions of the vehicle body; an electric drive unit for driving the first pulley; an endless belt put around the first and second pulleys with a slack thereof; a bracket for connecting a portion of the endless belt to the door; and a tensioning device for tensioning the endless belt. Due to provision of the slack of the belt, various advantages are obtained particularly when the door drive device of the invention is used in combination with other door controllers.

15 Claims, 3 Drawing Sheets

DRIVE DEVICE OF SLIDE DOOR

BACKGROUND OF THE INVENTION

1. Field of the Invention

The present invention relates in general to power slide doors of a motor vehicle, and more particularly to drive devices for driving the slide doors.

2. Description of the Prior Art

In order to clarify the task of the present invention, one conventional drive device of an automotive slide door will be described, which is disclosed in Japanese Patent First Provisional Publication No. 61-36480.

The conventional door drive device comprises generally a drive cable which extends around a given oval path defined beneath a vehicle floor, several pulleys around which the drive cable is put, a drive drum which has both ends of the drive cable wound therearound, and a reversible motor which drives the drive drum. An electromagnetic clutch and a speed reduction gear are arranged between the drive drum and the motor. The drive cable is fixed to the door at a portion.

Thus, when, with the clutch being engaged, the motor is energized to run in a given direction, the drive drum is rotated to drive the drive cable. With this, the door is moved forward or rearward.

The reason of using the clutch between the drive drum and the speed reduction gear is to facilitate a movement of the door effected by manual labor. That is, when the door drive device gets out of order, the clutch is switched to assume its disengaged condition. Under this condition, the rotation of the drive drum carried out by manual movement of the door does not affect the speed reduction gear and the motor. If the manual movement of the door is carried out with the clutch kept engaged, a great resistance against the movement is produced by these devices.

However, the above-mentioned conventional door slide device has the following drawbacks due to its inherent construction.

First, by using the electromagnetic clutch, the door drive device becomes bulky, heavy, and costly.

Second, combining the above-mentioned door drive device with other door control devices such as those disclosed in Japanese Patent First Provisional Publication No. 1-164647 is difficult. The devices disclosed in Japanese Publication 1-164647 are an automatic door closure which forces the door to shift to a fully closed latched position when the door comes to a half-latch position, and a door lock canceller which forces the latched condition of the closed door to be canceled prior to starting the opening movement of the door. In fact, it is difficult to obtain timed operations for all of these control devices. For example, if the door drive device starts to operate prior to cancelling the latched condition of the door, a great load is applied to the cable, the speed reduction gear and the motor. Furthermore, if, upon closing of the door, the speed at which the door is shifted by the door closure device, and the speed at which the door is moved by the door drive device, are not matched, an excessive load is applied to both the door closure device and the door drive device.

SUMMARY OF THE INVENTION

It is therefore an object of the present invention to provide a drive device of an automotive slide door, which is free of the above-mentioned drawbacks.

According to a first aspect of the present invention, there is provided a drive device for driving a slide door of a motor vehicle. The drive device comprises guide means for defining in a body of the vehicle a way along which the slide door moves; first and second pulleys arranged at spaced positions of the vehicle body; drive means for driving the first pulley; a flexible endless belt means put around the first and second pulleys with a slack thereof; connecting means for connecting a portion of the endless belt means to the door; and an auxiliary guide means mounted on the vehicle body between the first and second pulleys for guiding the movement of the flexible endless belt around the first and second pulleys.

According to a second aspect of the present invention, there is provided a drive device for driving a slide door of a motor vehicle. The device comprises a guide rail secured to a body of the vehicle for guiding movement of the slide door; first and second pulleys arranged at spaced portions of the vehicle body beside the guide rail; an endless belt put around the first and second pulleys with a slack thereof; means for providing a meshed engagement between each of the first and second pulleys and the endless belt; an electric motor for driving the first pulley; a speed reduction gear operatively interposed between the electric motor and the first pulley; a bracket secured to the slide door, the bracket having an end by which a portion of the endless belt is grasped; and an auxiliary guide means mounted on the vehicle body between the first and second pulleys for guiding the movement of the flexible endless belt around the first and second pulleys.

According to a third aspect of the present invention, there is provided, in a motor vehicle having a slide door, a system which comprises a door lock mounted in the slide door, the door lock having a latch plate which is engageable with a striker of a vehicle body to achieve a latched condition of the door; a door closure which shifts the door to its fully-closed latched position when the door comes to a half-latch position; a lock canceller which cancels the locked condition of the door lock when energized; and a drive device for driving the slide door, which comprises: guide means for defining in a body of the vehicle a way along which the slide door moves; first and second pulleys arranged at spaced positions of the vehicle body; drive means for driving the first pulley; a flexible endless belt means put around the first and second pulleys with a slack thereof; connecting means for connecting a portion of the endless belt means to the door; and an auxiliary guide means mounted on the vehicle body between the first and second pulleys for guiding the movement of the flexible endless belt around the first and second pulleys.

According to a fourth aspect of the present invention, there is provided, in a motor vehicle having a slide door, a system which comprises a door lock mounted in the slide door, the door lock having a latch plate which is engageable with a striker of a vehicle body to achieve a latched condition of the door; a door closure which shifts the door to its fully-closed latched position when the door comes to a half-latch position; a lock canceller which cancels the locked condition of the door lock when energized; and a drive device for driving the slide door, which comprises a guide rail secured to a body of the vehicle for guiding movement of the slide door; first and second pulleys arranged at spaced portions of the vehicle body beside the guide rail; an endless belt put around the first and second pulleys with a slack thereof;

means for providing a meshed engagement between each of the first and second pulleys and the endless belt; an electric motor for driving the first pulley; a speed reduction gear operatively interposed between the electric motor and the first pulley; a bracket secured to the slide door, the bracket having an end by which a portion of the endless belt is grasped; and an auxiliary guide means mounted on the vehicle body between the first and second pulleys for guiding the movement of the flexible endless belt around the first and second pulleys.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

In the following, the door drive device of the present invention will be described in detail with reference to the drawings.

Figure 1:
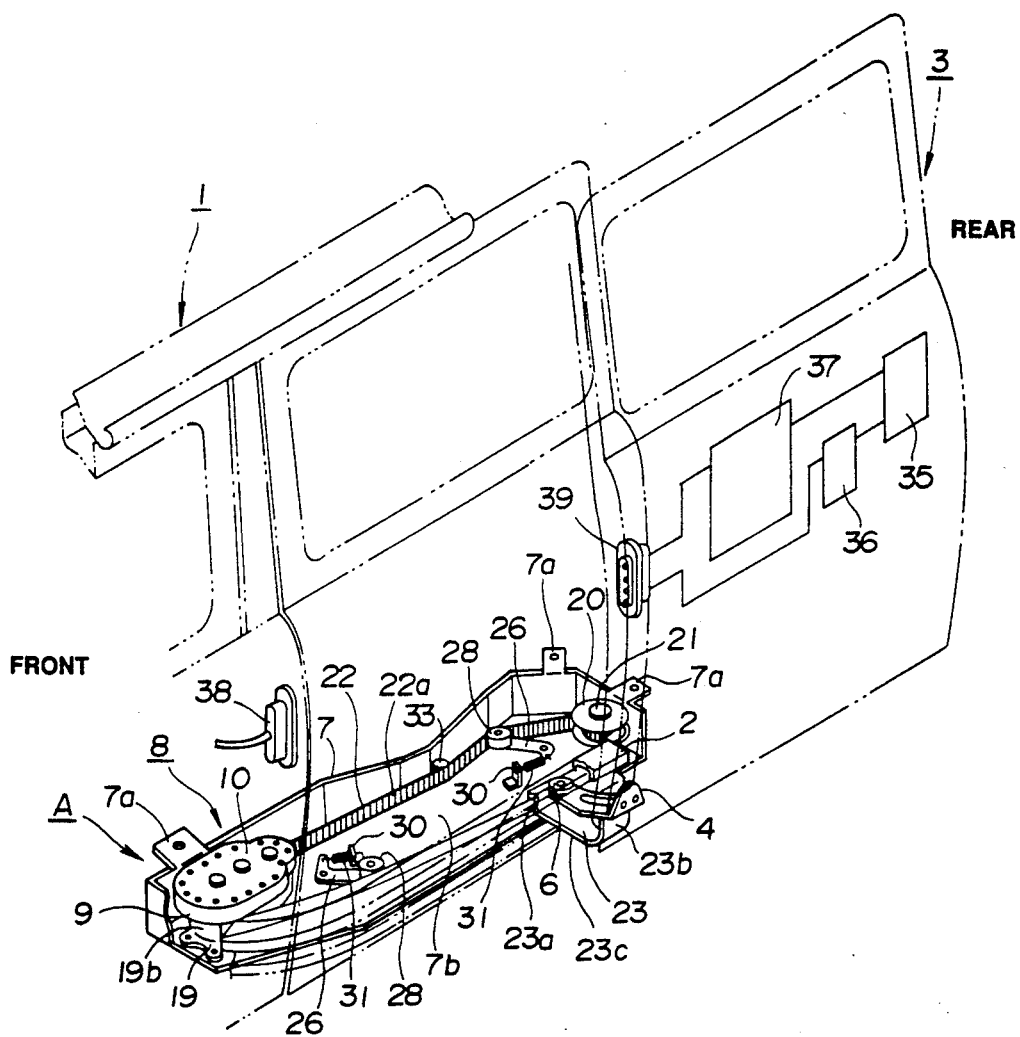
FIG. 1 is a partial perspective view of a motor vehicle to which the door drive device of the present invention is practically applied.

In FIG. 1, there is shown a motor vehicle to which the present invention is practically applied. In this drawing, denoted by numeral 1 is a body of the vehicle which has a door opening (no numeral) at one side wall. The door opening has a horizontal flat bottom portion which serves as a step for passengers. Denoted by numeral 2 is a lower guide rail which is secured to the vehicle body 1 below the step of the door opening and extends substantially horizontally.

Figure 2:
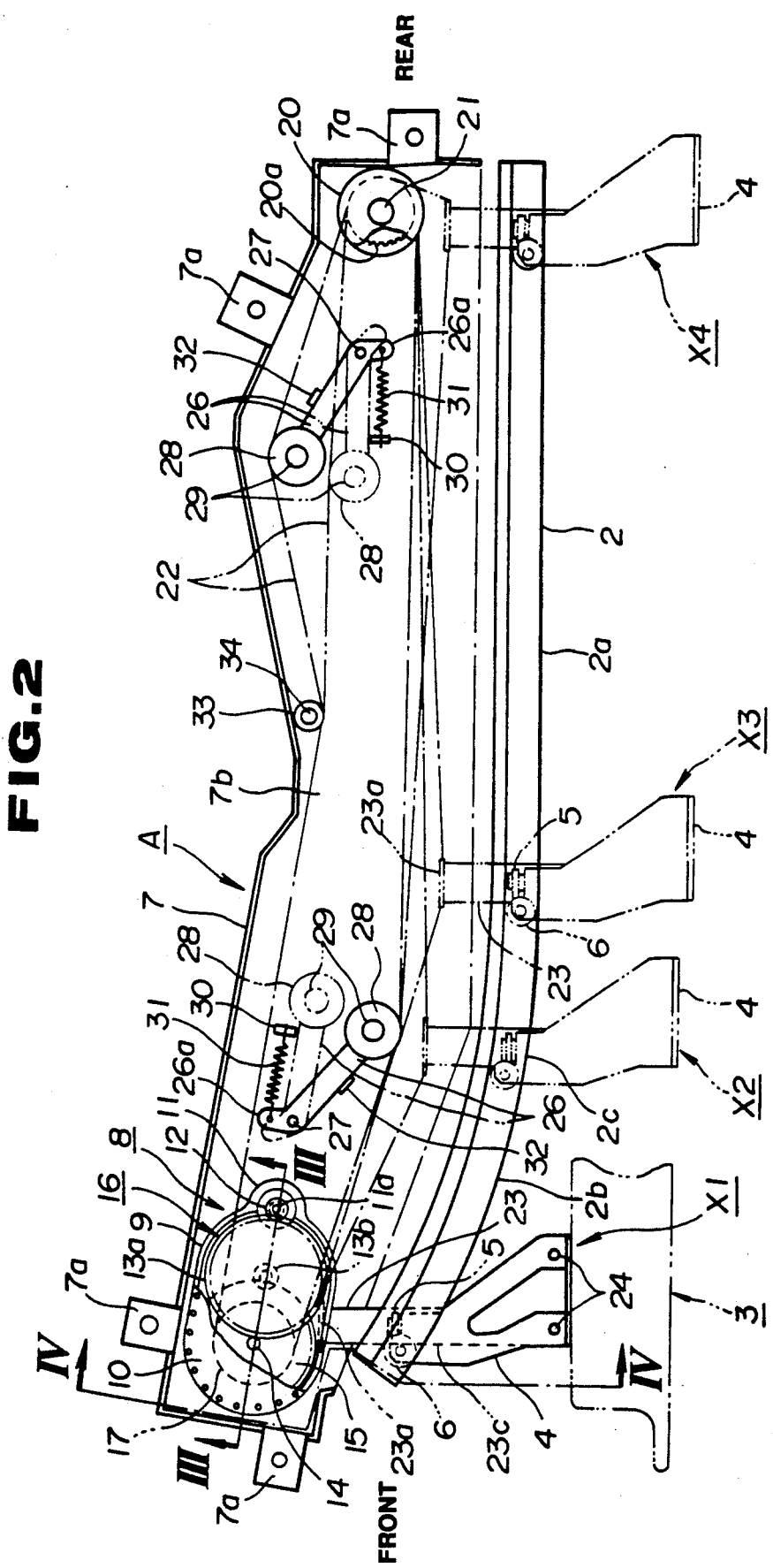
FIG. 2 is a partially cut plan view of the door drive device.

As is best seen from FIG. 2, the lower guide rail 2 has a front portion gradually curved toward the inside of the vehicle body 1.

Although not shown in the drawings, an upper rail is secured to an upper portion of the door opening, and a middle guide rail is secured to the side wall of the vehicle body 1 in the rear of the door opening. These two rails extend substantially horizontally.

Denoted by numeral 3 is a slide door which is guided by the upper, middle and lower guide rails in such a manner that after being shifted laterally outward from its full-closed position, the door 3 is moved rearward in parallel with the side wall of the vehicle body 1.

The door 3 has at its front lower portion a horizontal bracket 4 which extends toward the interior of the vehicle body. The bracket 4 is equipped at its leading end with both vertical and horizontal rollers 5 and 6 (see FIG. 2) which are rotatably engaged with and guided by the lower guide rail 2. The arrangement of these parts may be well understood from FIG. 4.

Figure 3:
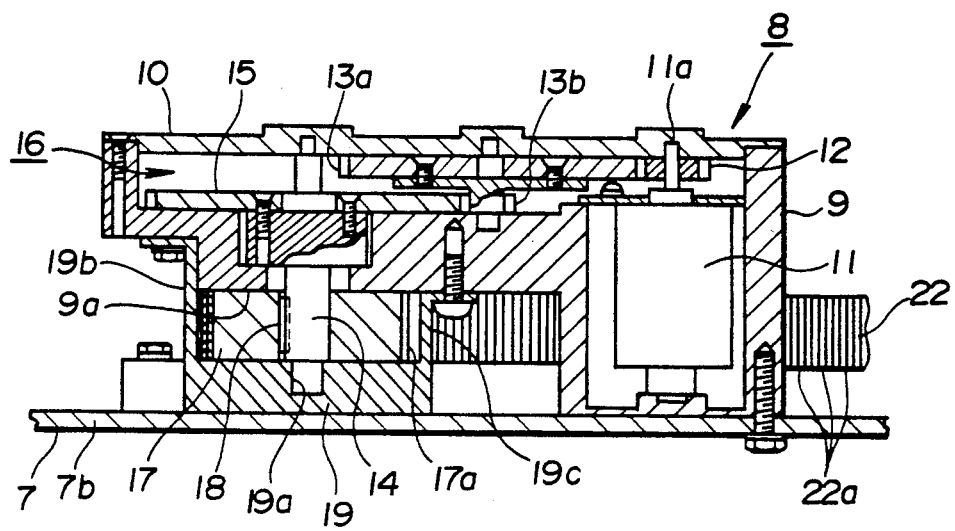
FIG. 3 is a sectional view taken along the line III—III of FIG. 2.

As is seen from FIGS. 1 and 3, mounted to the lower surface of the step of the door opening is an elongate case 7 of a door drive mechanism "A". For this mounting, the case 7 has at is upper portion several mounting lugs 7a which are bolted to the step. The bottom wall of the case 7 is designated by numeral 7b.

Within the case 7, there is installed a drive unit 8 which is located at a front portion of the case 7.

Figure 4:
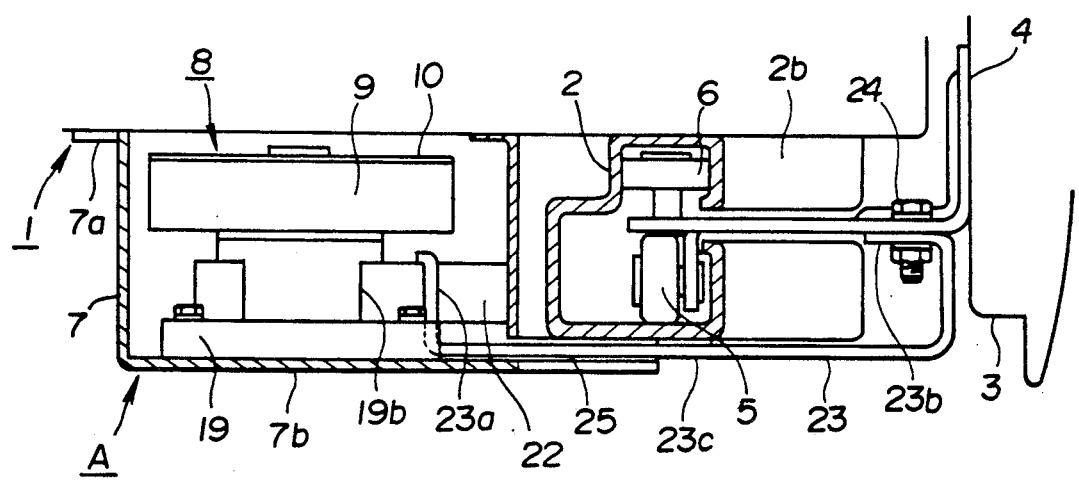
FIG. 4 is a sectional view taken along the line IV—IV of FIG. 2.

As is seen from FIGS. 3 and 4, the drive unit 8 comprises a housing 9 and a lid 10 which covers an upper opening of the housing 9. Within the housing 9, there is installed a reversible electric motor 11 whose output shaft 11a extends vertically. A first smaller spur gear 12 is secured to the output shaft 11a to rotate therewith. Operatively engaged with the first gear 12 is a second larger spur gear 13a which is rotatably held by and between the housing 9 and the lid 10. A third smaller spur gear 13b is secured to a lower side of the second gear 13a to rotate therewith. Operatively engaged with the third gear 13b is a fourth larger spur gear 15 which is coaxially secured to a vertically extending output shaft 14. In order to support the second, third and fourth gears 13a, 13b and 15, the housing 9 has a thicker supporting part 9a which is positioned above the bottom wall 7b of the case 7. Designated by numeral 19 is a bearing member which has a blind bore 19a into which a lower end of the output shaft 14 is rotatably received. The bearing member 19 has two walls 19b and 19c by which the thicker supporting part 9a is supported.

The first gear 12, the second gear 13a, the third gear 13b and the fourth gear 15 constitute a speed reduction gear 16.

The output shaft 14 has a lower portion to which a drive pulley 17 is coaxially secured by means a key 18. The cylindrical outer surface of the drive pulley 17 is formed with evenly spaced splines or teeth 17a for the purpose which will be clarified hereinafter.

Referring back to FIG. 1, a driven pulley 20 is further installed at a rear portion of the case 7, which pulley has a vertically extending rotation shaft 21. Similar to the drive pulley 17, the cylindrical outer surface of the driven pulley 20 is formed with evenly spaced splines or teeth 20a.

Around the drive and driven pulleys 17 and 20, there is slackly put an endless belt 22 which has a toothed inner surface operatively meshed with the teeth 17a and 20a of the pulleys 17 and 20. The teeth of the belt 22 are denoted by numeral 22a.

As is seen from FIGS. 2 and 4, one portion of the belt 22 is fixed to a belt holding bracket 23 which extends from the door 3. More specifically, the belt holding bracket 23 has a base portion 23b secured to the bracket 4 through bolts 24 and nuts and extends horizontally under the bracket 4 and projects into the case 7 through a longitudinally extending slot 25 formed in an outside wall of the case 7.

As is best seen from FIG. 4, the projecting end 23a of the belt holding bracket 23 is vertically raised for tightly grasping the belt 22.

As is well seen from FIGS. 1 and 2, front and rear tensioners are installed in the case 7 to tension the belt 22, thereby taking up the slack of the belt 22. These front and rear tensioners are arranged to tension outside and inside parts of the belt 22, respectively.

It is to be noted that the outside part of the belt 22 means one half part of the belt 22 which extends along an outside way between the drive and driven pulleys 17 and 20, while the inside part of the belt 22 means the other half of the belt 22 which extends along an inside way between the two pulleys 17 and 20.

As is seen from FIG. 2, each tensioner comprises a vertically extending pivot shaft 27, an arm 26 having a base portion pivotally connected to the pivot shaft 27, a tension roller 28 rotatably mounted to a leading end of the arm 26 through a pin 29, and a spring 31 for biasing the arm 26 in a direction to press the tension roller 28 against the toothed inner surface of the belt 22. The spring 31 has one end hooked to a projection 26a of the arm 26 and the other end hooked to a projection 30 of the bottom wall 7b of the case 7.

Designated by numeral 32 is a stopper formed on the bottom wall 7b of the case 7, by which an excessive pivoting of each arm 26 toward the belt 22 is restricted. An excessive pivoting of the arm 26 in the other direction, that is, in a direction away from the belt 22, is restricted by the projection 30.

As is seen from FIG. 2, the front tensioner is so arranged that when the brackets 4 and 23 come to a junction zone 2c between straight and curved portions 2a and 2b of the guide rail 2, the belt 22 is separated from the tension roller 28, and when the brackets 4 and 23 are moved forward or rearward away from the junction zone 2c of the guide rail 2, the belt 22 becomes into contact with the tension roller 28. With this arrangement, the raised inside end of the belt holding bracket 23 is prevented from contacting the tension roller 28.

While, the rear tensioner is so arranged as to tension the belt 22 constantly.

As is seen from FIG. 2, a guide roller 33 is arranged between the drive pulley 17 and the rear tensioner, which constantly contacts the outer surface of the belt 22.

Referring back to FIG. 1, within the door 3, there are installed a known door lock 35, a known lock canceller 36 and a known door closure 37, which are disclosed in the above-mentioned Japanese Patent First Provisional Publication No. 1-164647. Furthermore, an electric connector is employed, which comprises a body-mounted connector part 38 and a door-mounted connector part 39. When, under closing movement, the door 3 comes to a so-called "power feeding position" just before a half-latch position, the door-mounted connector part 39 is brought into engagement with the body-mounted connector part 38, so that thereafter electric feeding from a battery on the vehicle body to the electric devices in the door 3 becomes available.

In the following, operation of the door drive device of the present invention will be described with reference to the drawings.

For ease of understanding, the description will be commenced with respect to a condition wherein the door 3 is fully closed and latched.

Under this condition, the brackets 4 and 23 and the endless belt 22 assume the positions as illustrated by solid lines in FIG. 2. The positions of the brackets 4 and 23 in this condition are denoted by reference "X1". As shown, each tension roller 28 is pressed against the belt 22 to softly tension the same with arm 26 abutting against the stopper 32.

When a door open control switch (not shown) installed in a driver's room is manipulated to take the ON position, the electric power of the battery is fed to the lock canceller 36 through the connector (38 and 39). Thus, the locked condition of the door lock 35 is cancelled.

Upon this, the door 3 is somewhat shifted outward due to the restoring force of a door seal and the biasing force applied to a latch plate of the door lock 35. In response to this outward shifting of the door 3, the portion of the belt 22 which is fixed to the bracket 23 is somewhat moved rearward. However, this rearward movement of the portion is quickly absorbed by the entire of the belt 22 by the work of the belt tensioners.

When thereafter, the motor 11 is energized to run in a certain direction, the drive pulley 17 is rotated in a counterclockwise direction in FIG. 2.

However, due to the meshed engagement between the drive pulley 17 and the belt 22, and due to the softly tensioned condition of the belt 22, the rotation of the drive pulley 17 does not induce an instant movement of the door 3 in the door opening direction. That is, at a first stage, the rotation of the drive pully 17 is used for only eliminating the slack of the belt 22. During this slack elimination, the two tensioners are gradually pivoted toward their inoperative positions as illustrated by phantom lines.

When, due to elimination of the slack, the belt 22 becomes highly tensioned, the rotation of the drive pulley 17 induces a rearward movement of the belt holding bracket 23. Thus, the door 3 is moved rearward.

It is to be noted that the time lag taken when the door 3 is actually moved after starting of the drive pulley 17 is quite advantageous in operating the other door controllers.

For example, even if the lock cancelling operation of the lock canceller 36 is somewhat delayed, the delayed movement of the door 3 by the belt 22 can compensate such mis-timed operation of the lock canceller 36.

This means that the motor 11 for the door drive device can be started at the same time as or somewhat prior to the operation of the lock canceller 36.

As is known to those skilled in the art, simultaneous energization of two devices (viz., the motor 11 and lock cancellor 36) is easily controlled.

Furthermore, if, after starting of the motor 11, the lock canceller 36 is actuated during the time when the slack of the belt 22 is being decreased, the restoring force of the door seal and the biasing force applied to the latch plate of the door lock 35 can be effectively used as an initial force for shifting the door 3 laterally outward from the full-closed position.

When the door 3 is then moved rearward slightly from the laterally outward shifted position, the outside part of the belt 22 becomes detached from the front tensioner. It is to be noted that, under this condition, the stopper 32 stops an excessive pivoting of the arm 26 toward the belt 22.

When then the door 3 is moved rearward to a slightly open position where the horizontal bracket 4 is positioned beside the junction zone 2c of the guide rail 2 as illustrated by a phantom line "X2" of FIG. 2, the projecting end 23a of the belt holding bracket 23 is positioned away from the tension roller 28 of the front tensioner, as shown.

When then the door 3 comes to a position where the horizontal bracket 4 is positioned at the straight portion 2a of the guide rail 22 as illustrated by a phantom line "X3" of FIG. 2, the outside part of the belt 22 becomes in contact with the tension roller 28 of the front tensioner. Thereafter, the contact between the tension roller 28 of the front tensioner and the belt 22 is kept until the bracket 4 comes to the position "X4" of FIG. 2 where the door 3 assumes its full-open position.

When the door 3 thus comes to the full-open position, a limit switch (not shown) for sensing the full-open condition of the door 3 is operated to stop energization of the motor 11. While, when, during movement of the door 3 toward the full-open position, the door open control switch is turned OFF, energization of the motor 11 is stopped and thus the door 3 is forced to stop at a half-open position.

When the door 3 stops at the full-open position or the half-open position, the arm 26 of each tensioner is forced to pivot in a clockwise direction in FIG. 2 by the force of the spring 31 thereby to apply a suitable tension to the belt 22. Thus, slack of the belt 22 is taken up or eliminated. During this, the drive pulley 17, the speed reduction gear 16 and the output shaft 11a of the motor 11 may be somewhat driven by the tensioning force produced by the front and rear tensioners.

When, with the door 3 assuming the full-open position or the half-open position, a door close control switch (not shown) positioned beside the above-mentioned door open control switch is manipulated to take ON position, the motor 11 is energized to turn in a reversed direction and thus the drive pulley 17 is rotated in a clockwise direction in FIG. 2.

At a first stage, the rotation of the drive pulley 17 is used for eliminating the slack of the belt 22. During this slack elimination, the two tensioners are gradually pivoted toward their small-angled positions as illustrated by the phantom lines.

When, due to elimination of the slack, the belt 22 becomes highly tensioned, the clockwise rotation of the drive pulley 17 induces a forward movement of the belt holding bracket 23. Thus, the door 3 is moved forward.

When the door 3 comes to the power feeding position just before the half-latch position, the door-mounted connector part 39 is brought into engagement with the body-mounted connector part 38, and thus power feeding from the battery in the vehicle body to the door closure 37 in the door 3 becomes available. When then the door 3 comes to the half-latch position wherein the latch plate of the door lock 35 is hafly latched with the striker of the vehicle body, the door closure 37 becomes energized. Thus, the latch plate of the door lock 35 is forced to pivot into its full-latched position forcing the door 3 to move to the full-closed latched position.

It is to be noted that the movement of the door 3 from the half-latch position to the full-closed latched position is achieved by both the motor 11 of the door drive device and the door closure 37. Thus, this movement is assuredly carried out.

It is further to be noted that even when the speed at which the door is shifted from the half-latch position to the full-closed latched position by the door closure 37 is greater than the speed at which the door is shifted by the motor 11 of the door drive device, such mismatched operation can be compensated by having the belt 22 slackened between the drive pulley 17 and the belt holding bracket 23.

When, with the door 3 assuming the full-open position or the half-open position, a manual labor is applied to the door 3 for the purpose of moving the door in the closing direction, only the door 3 and a part of the belt 22 are moved at a first stage.

That is, at the first stage, the closing movement of the door 3 is used for eliminating the slack of the belt 22 tensioned by the rear tensioner. More specifically, as the first stage, the closing movement of the door 3 does not induce a movement of the entire of the belt 22 until the slack of the belt 22 is eliminated.

When the slack of the belt 22 is eliminated and thus belt 22 becomes highly tensioned by the continued closing movement of the door 3, the drive pulley 17, the speed reduction gear 16 and the output shaft 11a of the motor 11 are driven by the movement of the door 3.

Accordingly, an initial movement of the door 3 by manual labor in the door closing direction is easily carried out with a light force. That is, just at the time when the closing movement of the door 3 comes to have a sufficient inertial force, the drive pulley 17, the speed reduction gear 16 and the output shaft 11a of the motor 11 are driven by the movement of the door 3.

It is to be noted that a load applied to the door 3 when these three devices 17, 16 and 11 are driven produces a suitable check against the closing movement of the door 3 and thus the manual closing movement of the door 3 is carried out with a comfortable operation feeling.

When, with the door assuming the full-closed latched position, it is needed to open the door 3 with a manual labor, a door handle (not shown) of the door 3 is manipulated to cancel the locked condition of the door lock 35. Upon this cancellation, the door 3 is somewhat shifted laterally outward due to the restoring force of the door seal. Thus, if this outward shifting of the door 3 is timely used, a subsequent opening movement of the door 3 is easily carried out with a light force. This easy movement of the door 3 in the opening direction is achieved irrespective of whether the slack of the belt 22 has been present or not before the movement of the door 3.

If desired, the following modifications may be employed in the invention.

(1) In place of the above-mentioned toothed belt 22, wire, chain and the like can be used.

(2) One or more than two tensioners can be used for tensioning the belt 22.

(3) In addition to the tensioners of the above-mentioned type, various types of tensioners are usable. One of them may be a type in which a spring biased tension roller is slidably held on a fixed holder which extends perpendicular to the path of the belt 22.

In the following, advantages of the present invention will be described.

(a) In the invention, there is no need of using an expensive electromagnetic clutch in the door drive device. That is, the output shaft 11a of the motor 11 and the belt 22 are constantly connected. Thus, the door drive device of the present invention can have a simple, compact, light-weight and low-costed construction.

(b) Because the belt 22 is put around the drive and driven pulleys 17 and 20 with a suitable slack, the initial opening or closing movement of the door 3 by manual labor is easily carried out with a light force as has been described hereinabove. That is, due to the provision of the slack, the driving of the drive pulley 17, the speed reduction gear 16 and the output shaft 11a of the motor 11 by the manual movement of the door 3 is not effected until the movement of the door 3 has a sufficient inertial force.

(c) In case wherein the door drive device of the invention is used in combination with the door closure and the door lock canceller in the above-mentioned manner, mis-timed operations of these devices can be compensated due to the provision of the slack of the belt 22. Thus, these devices are prevented from being applied with the excessive load.

What is claimed is:

1. A drive device for driving a slide door of a motor vehicle comprising:
   guide means for defining in a body of said vehicle a way along which said slide door moves;

first and second pulleys each having a cylindrical outer surface and being arranged at spaced positions of the vehicle body;

drive means for driving said first pulley, said drive means and said first pulley being constantly connected so that separation of them never occurs;

a flexible endless belt being disposed around said first and second pulleys and having a slack portion therein;

connecting means for connecting a portion of said endless belt to said door; and tensioning means, mounted on said vehicle body between said first and second pulleys, for tensioning said flexible endless belt in a manner to eliminate said slack portion in said flexible endless belt, wherein the cylindrical outer surface of each of said first and second pulleys has a plurality of teeth thereon, and said flexible endless belt has a toothed inner surface operatively engaged with the teeth of said first and second pulleys.

2. A drive device as claimed in claim 1, in which said drive means comprises:

an electric motor; and a speed reduction gear powered by said electric motor, said speed reduction gear having an output shaft by which said first pulley is driven.

3. A drive device as claimed in claim 1, in which said tensioning means is at least one tensioner which comprises:

a tension roller having a cylindrical outer surface which is contactable with the toothed inner surface of said belt; and biasing means for biasing and pressing said tension roller against said toothed inner surface of said belt.

4. A driven device as claimed in claim 3, in which said biasing means comprises:

an arm having one end pivotally connected to the body of said vehicle and the other end rotatably holding said tension roller; and a spring for biasing said arm in a direction to press said tension roller against the belt.

5. A drive device as claimed in claim 1, further comprising a guide roller for guiding the movement of said flexible endless belt.

6. A drive device for driving a slide door of a motor vehicle, comprising:

guide means for defining in a body of said vehicle a way along which said slide door moves;

first and second pulleys, each having a cylindrical outer surface, and being arranged at spaced positions of the vehicle body;

drive means for driving said first pulley;

a flexible endless belt put around said first and second pulleys with a slack thereof, said flexible endless belt being in meshed engagement with said first and second pulleys;

connecting means for connecting a portion of said flexible endless belt to said door;

tensioning means, mounted on said vehicle body, between said first and second pulleys, for guiding the movement of said flexible endless belt around said first and second pulleys and for tensioning said flexible endless belt in a manner to eliminate said slack; and a stopper;

wherein the outer surface of each of said first and second pulleys has a plurality of teeth thereon, and said flexible endless belt has a toothed inner surface operatively meshed with the teeth of said first and second pulleys;

wherein said tensioning means is at least one tensioner which comprises a tension roller having a cylindrical outer surface which is contactable with the toothed inner surface of said belt; and biasing means for biasing and pressing said tension roller against said toothed inner surface of said belt;

wherein said biasing means comprises an arm having one end pivotally connected to the body of said vehicle and the other end rotatably holding said tension roller; and a spring for biasing said arm in a direction to press said tension roller against the belt; and wherein said arm abuts against said stopper to restrict the tension applied to said belt by said tension roller.

7. A drive device as claimed in claim 6, in which said connecting means comprises a bracket which has one end fixed to said door and the other end which tightly grasps the portion of said belt.

8. A drive device as claimed in claim 7, in which said guide means comprises a guide rail which includes straight and curved portions which are integrally connected at a junction zone.

9. A drive device as claimed in claim 8, in which said tensioning means is positioned near said junction zone of said guide rail.

10. A drive device for driving a slide door of a motor vehicle, comprising:

a guide rail secured to a body of the vehicle for guiding movement of said slide door;

first and second pulleys each having a cylindrical outer surface and being arranged at spaced portions of the vehicle body beside said guide rail;

a flexible endless belt being disposed around said first and second pulleys and having a slack portion therein;

an electric motor for driving said first pulley;

a speed reduction gear operatively interposed between said electric motor and said first pulley for constantly connecting said motor to said first pulley;

a bracket secured to said slide door, said bracket having an end by which a portion of said endless belt is grasped; and tensioning means, mounted on said vehicle body between said first and second pulleys, for tensioning said flexible endless belt in a manner to eliminate said slack portion in said flexible endless belt, wherein the cylindrical outer surface of each of said first and second pulleys has a plurality of teeth thereon, and said flexible endless belt has a toothed inner surface operatively engaged with the teeth of said first and second pulleys.

11. A drive as claimed in claim 10, in which said tensioning means comprises two tensioners for tensioning said flexible endless belt.

12. A drive device for driving a slide door of a motor vehicle, comprising:

a guide rail secured to a body of the vehicle for guiding movement of said slide door;

first and second pulleys arranged at spaced portions of the vehicle body beside said guide rail;

an endless belt put around said first and second pulleys with a slack thereof;

means for providing a meshed engagement between each of said first and second pulleys and said endless belt;

an electric motor for driving said first pulley;

a speed reduction gear operatively interposed between said electric motor and said first pulley;

a bracket secured to said slide door, said bracket having an end by which a portion of said endless belt is grasped; and auxiliary guide means mounted on said vehicle body between said first and second pulleys for guiding the movement of said flexible endless belt around said first and second pulleys;

wherein said auxiliary guide means comprises two tensioners for tensioning said endless belt;

wherein each of said tensioners comprises
- a tension roller having a cylindrical outer surface which is contactable with the toothed inner surface of said belt;
- an arm having one end pivotally connected to the body of said vehicle and the other end rotatably holding said tension roller; and
- a spring for biasing said arm in a direction to press said tension roller against the belt.

13. In a motor vehicle having a slide door, a door lock mounted in said slide door, said door lock having a latch plate which is engageable with a striker of a vehicle body to achieve a latched condition of said door;

a door closure which shifts the door to its fully-closed latched position when the door comes to a half-latch position;

a lock canceller which cancels the locked condition of said door lock when energized; and a drive device for driving the slide door, which comprises:
- guide means for defining in a body of said vehicle a way along which said slide door moves;
- first and second pulleys each having a cylindrical outer surface and being arranged at spaced positions of the vehicle body;
- drive means for driving said first pulley, the drive means and said first pulley being constantly connected so that separation of them never occurs;
- a flexible endless belt being disposed around said first and second pulleys and having a slack portion therein;
- connecting means for connecting a portion of said endless belt means to said door; and
- tensioning means, mounted on said vehicle body between said first and second pulleys, for tensioning said flexible endless belt in a manner to eliminate said slack portion in said flexible endless belt, wherein the cylindrical outer surface of each of said first and second pulleys has a plurality of teeth thereon, and said flexible endless belt has a toothed inner surface operatively engaged with the teeth of said first and second pulleys.

14. In a motor vehicle having a slide door, a door lock mounted in said slide door, said door lock having a latch plate which is engageable with a striker of a vehicle body to achieve a latched condition of said door;

a door closure which shifts the door to its fully-closed latched position when the door comes to a half-latch position;

a lock canceller which cancels the locked condition of said door lock when energized; and a drive device for driving the slide door, which comprises:
- a guide rail secured to a body of the vehicle for guiding movement of said slide door;
- first and second pulleys each having a cylindrical outer surface and being arranged at spaced portions of the vehicle body beside said guide rail;
- an endless belt disposed around said first and second pulleys and having a slack portion therein;
- an electric motor for driving said first pulley;
- a speed reduction gear operatively interposed between said electric motor and said first pulley, said electric motor being constantly connected to said first pulley via said speed reduction gear;
- a bracket secured to said slide door, said bracket having an end by which a portion of said endless belt is grasped; and
- tensioning means, mounted on said vehicle body between said first and second pulleys, for tensioning said endless belt in a manner to eliminate said slack portion in said endless belt, wherein the cylindrical outer surface of each of said first and second pulleys has a plurality of teeth thereon, and said endless belt has a toothed inner surface operatively engaged with the teeth of said first and second pulleys.

15. A drive device as claimed in claim 14, in which said tensioning means comprises two tensioners for tensioning said endless belt.

* * * * *